Figure 1:
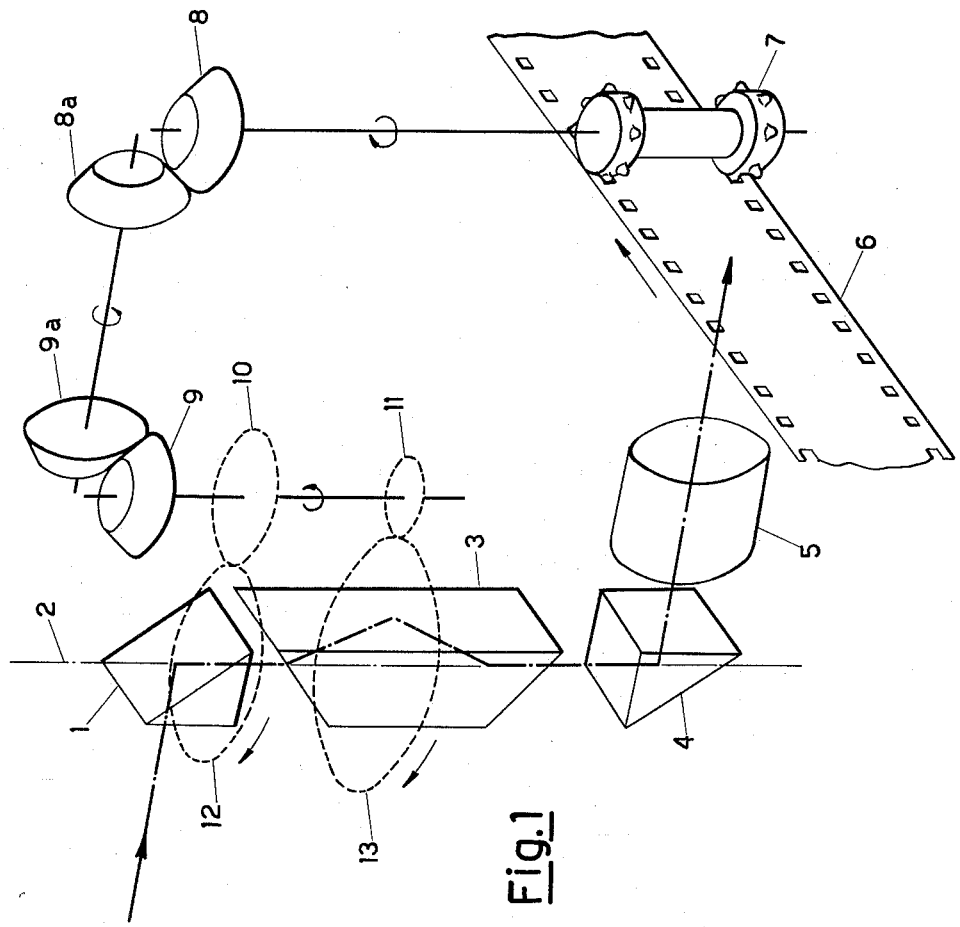

Dec. 27, 1960  L. D'INCERTI ET AL  2,966,096
PANORAMIC MOTION PICTURE APPARATUS
Filed Feb. 8, 1956  2 Sheets-Sheet 1

INVENTORS
LODOVICO D'INCERTI
BY GIACOMO DEL TORRE
ATTORNEY.

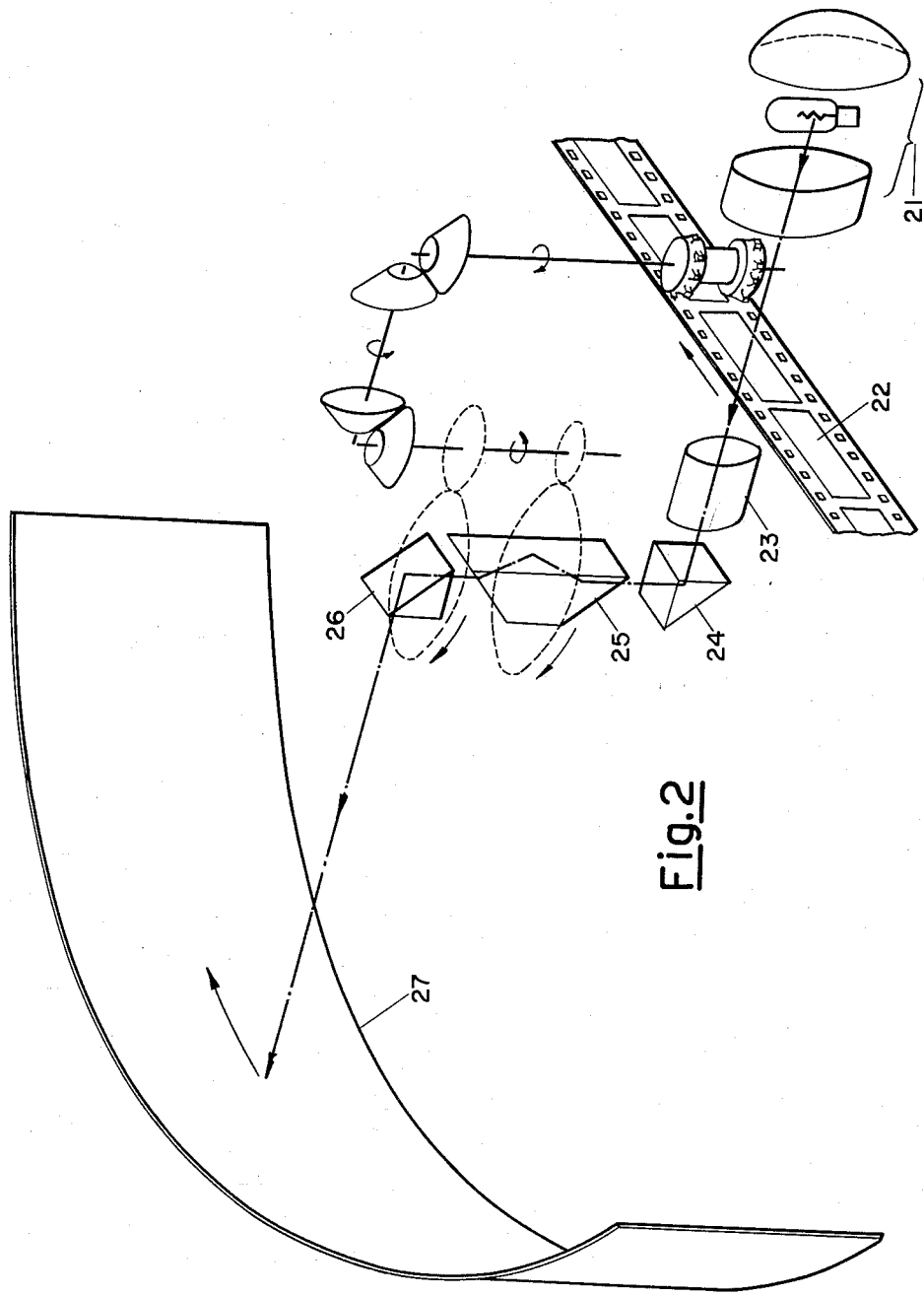

United States Patent Office 2,966,096
Patented Dec. 27, 1960

2,966,096
PANORAMIC MOTION PICTURE APPARATUS
Lodovico d'Incerti and Giacomo del Torre, both of Via Lucano 2, Milan, Italy
Filed Feb. 8, 1956, Ser. No. 564,322
Claims priority, application Italy Nov. 24, 1955
7 Claims. (Cl. 88—16.8)

Devices hitherto used for standard cinematography are most commonly based upon the principle of registering on a film, having a predetermined intermittent movement imparted thereto, a series of fixed photographic images obtained with an ordinary objective, each of which reproduces a subsequent element of the movement. The film stops for the time in which a registered image is projected thereagainst, while in the subsequent interval, during which the film moves, a shutter intercepts the light. When a positive copy obtained from this film is passed through a standard projector constituted essentially by a lamp house and by an objective, in the same manner as used in taking, that is, by projecting successively one by one the fixed images with the same timing as during the taking, and if the beam of light is intercepted during the passage from one frame or still picture to the subsequent frame, the result is that owing to the well-known phenomenon of "persistence of vision," the observer receives the impression of seeing the sequence of still pictures of an action as if it were reproduced in motion.

The devices used for particular purposes, e.g. in movieolas (moviolas) or in ciné cameras for shooting at elevated frequencies, which enable elimination of the stopping time of the film by means of optical compensation of the bundle of like rays transmitted by the objective or other equivalent optical system, do not alter substantially the principle set forth above, because actually the image remains at standstill on the film or on the screen for the whole time during which the transmission of the photograph lasts, even if the film moves with continuous motion during that time. Further, the above stated principle is not varied by the improvements introduced to improve and to complete the quality of taking or of projecting, such as: the application of a multiple sound track or of multiple sound tracks; the addition of colour; stereoscopic or three-dimensional projecting; panorama screens; multiple projection types; the use of large-size films; and the use of films travelling in the horizontal direction of the Vista-Vision type.

The system according to the present invention on the contrary solves the problem of recording moving images on a photo-sensitive film and of projecting the recorded images in a quite different manner. In recording the motion, individual still photographs are no longer obtained as a series of successive still pictures of the motion on the photo-sensitive (blank) film forwarded intermittently and held at standstill at the time of exposure; but by means of registration of successive individual partial areas of the picture or image, which progressively and without gaps cover the entire field. At the same of exposure the photo-sensitive film is given a continuous uniform movement in the same sense and with the same speed with which the image progresses and, therefore, since there is no relative movement between the two, the image is registered optically at rest.

One mode of applying the principle set forth above might be to extend to cinematography the solution used experimentally with some cameras for panoramic photography, wherein the entire structure of the apparatus is made to turn about a vertical axis passing through the optical centre of the objective; but the weight and the heterogeneous character of the mass, the relationship of such heavy mass with the elevated speed of rotation that is necessary, the difficulty of handling, and various other inconveniences would render such form of application irrational if not completely non-feasible. On the contrary, the present invention solves the problem in a practical, ingenious and technically feasible manner. In accordance with an aspect of this invention, the camera with its objective and with all its adjusting devices is stationary and only a special optical assembly formed by prisms of relatively small weight turns about a vertical axis and explores ("scans") the sector to be reproduced; the successive elements of the image are transmitted to the objective as they enter its field, and the objective projects them upon a transverse zone of the blank, photo-sensitive film. This film travels horizontally before the objective with a continuous movement in the same sense of the displacement of the image, at a speed that is strictly related with the speed of rotation of the optical system so that the elements of the image are registered in this way without any discontinuities. When the system of prisms has finished scanning the sector in question, a complete registered image of that sector appears on a zone of the film. While the optical assembly of prisms completes its rotation and until the sector in question again enters its field of view, the registration on the blank film may cease; only to recommence with a second image of the sector and so on. It is clear that with this system there is no limit to the field of vision and that it is possible in the extreme case, to obtain repeated views through an angle of 360°, or one may limit oneself to a wide panoramic image of less than 360°. In the extreme case of viewing around a complete circle, the successive images appear on the film without intervals therebetween; and, in the more limited cases, where only an angular section is viewed, intervals appear between the successive views on the film that can be adjusted at will, by modifying the conditions of translatory motion of the film at the time during which there is an interval between registrations, that is, during each period when the system of prisms is completing its rotation following scanning of the desired sector. Thus, the translatory motion of the film may be kept constant and uniform and as a consequence there will be a more or less wide interval between the successive exposed portions, which then may be exposed to images which coincide with such intervals; or the film may be temporarily stopped, to limit the interval to a narrow zone.

In a projector embodying this invention, the same principle is applied. Thus, individual still photographs of the positive film are no longer projected as complete successive images entirely covering the screen at any time, but, instead, successive partial areas of the viewed scene are projected which progressively and without discontinuity scan the whole scene. In order to embody that principle, the projecting device is formed substantially by the same elements as the camera hereinbefore set forth. The positive film obtained from the negative film in the manner hereinbefore described, travels horizontally before a fixed projecting objective, with continuous uniform motion, and a beam of light concentrated vertically is directed through a vertical zone of the moving film in the area of the fixed objective. In the case of a projector, the objective scans the successive elements of the image registered on the film, as they pass before it, and transmits such successive elements to an optical assembly of prisms rotating about a vertical axis and which in turn projects the successive elements onto the screen. If the speed of rotation of this optical assembly is not lower than 16 revolutions per second, the corresponding elements of the successive images merge by reason of the "persistence of vision" and create in the observer the impression of continuity of the movement as in standard cinematography.

In the case in which the camera recorded the view around a complete circle, or a very wide sector, the screen should be arranged along a circle or arc of a circle at the centre of which the projector is placed. In case a limited sector is taken, e.g. of dimensions analogous to those of a Cinemascope, the longitudinal photographs obtained on the negative film may even be transferred, with a special optical printing device, onto a positive film for standard cinematography, and arranged transversally or successively as those of a standard film. Since the ratio between the two sides of the photogram will be at any rate different from that commonly used at present, it is possible in that case to resort to two solutions: either keeping the rate of advancement of the film unvaried, and leaving a wider interval between the individual photograms (and in this case the film will be adapted to be projected with standard projectors, without any modification); or printing the photograms with a reduced interval between them, and then it will be necessary to vary the rate of advancement of the film. In any case, with a standard projector, there will be obtained a panoramic image similar to that of Cinemascope, without using an anamorphic lens.

The present cinematograph system is also suitable to register anamorphic images where it is deemed convenient to limit the length and the consequent cost of the film: in this case it is necessary to interpose in the optical assembly a cylindrical lens or a system of cylindrical lenses and to vary the ratio between the speed of translatory film feed and that of rotation of the group of prisms so that there will be obtained compressed images which at the time of projection will be returned in their natural proportions, while the ratio of speeds as used in taking or recording the images is maintained during projection thereof. If this latter method is used, the compressed panoramic images can even be printed on standard positive film and projected with a standard projector provided with a suitable divergent anamorphic lens.

A considerable secondary advantage of the cinematograph system of the invention lies in the circumstance that, for the registration and projection of images, only the central rays of the respective objectives are utilized, which have little inclination in respect of the optical axis, so that the images obtained therewith are, therefore, nearly free from optical aberrations and at any rate (as distinct from what happens with conventional systems) they are not affected by any difference of correction and, therefore, of sharpness, between the extreme periphery and the centre. This fact renders possible the use, with good results, of objectives of very strong luminosity (brightness), whose correction at the borders cannot be perfect, or of cheap objectives which are imperfectly corrected.

The system embodying this invention can employ any known method for registering one or more sound tracks with the film, and there is no limitation as to the kind of photography that may be obtained in black and white or in colours with any method. Also stereoscopic recording of the images and projecting thereof is possible with the system embodying this invention, employing therefor any method valid for standard cinematography.

An embodiment of the system of the invention is diagrammatically illustrated in the accompanying drawings wherein:

Fig. 1 illustrates by way of example and in a merely indicative manner without limitation, a camera embodying this invention; and Fig. 2 similarly illustrates a projector embodying this invention.

Referring to the drawings in detail, and initially to Fig. 1 thereof, it will be seen that a motion picture camera embodying this invention includes a first prism 1 with total reflection which turns with uniform motion about its central vertical axis 2. A dove prism 3 is disposed below and coaxial with the first objective 1, and rotates about the same axis in the same direction with an angular speed equal to one half of that of the prism 1 in the same direction.

On the horizontal axis of the prism 4 there is placed a fixed objective 5 in such a position as to form a sharp picture on the blank photo-sensitive film 6 which lies in a vertical plane and is moved longitudinally in the horizontal direction, with a continuous uniform motion by a toothed roll or sprocket 7. The speed of translatory motion of said film depends on the speed of rotation of the prism 1 and, in the case of standard recording of images, that is, with an image without anamorphatic deformation, the speed of movement of the film, in centimetres per second, is given by the formula:

$$2\pi F \times n$$

where F is the focal length in centimetres of the objective 5 and $n$ is the number of revolutions per second of the prism 1.

How the translatory motion of the film 6 can be connected with the rotary motion of the two prisms 1 and 3, is shown by way of example in Fig. 1. On the shaft of the toothed roll 7 that moves the film there is mounted a bevel gear 8 meshing with a bevel gear 8a on an intermediate shaft that transmits movement to a bevel gear 9a meshing with a bevel gear 9. The gear 9 is fixed on a shaft that also carries two toothed wheels or gears 10 and 11. The toothed wheel or spur gear 10 meshes with a toothed rim 12 on the prism 1, while the gear 11 meshes with a toothed rim 13 fixed on the prism 3. The numbers of teeth on the gears 10 and 11 and the rims 12 and 13 are selected so that the angular speed of the rim 13 and prism 3 is half of the angular speed of the rim 12 and prism 1.

It should be understood that the whole assembly comprising the blank photo-sensitive film and the respective sprockets is enclosed in a sealed envelope or shell (not represented in the drawing) into which there penetrates only the beam of light from the objective 5.

The image collected by the rotating objective prism which scans the sector to be viewed or recorded, is transmitted to the isosceles prism 3 which owing to its well-known optical properties keeps said image (which otherwise would rotate in a horizontal plane) at standstill, while said prism 3 rotates in the same sense as prism 1 with an angular speed equal to half the angular speed of the prism 1 placed above it, and transmits said image in turn to the fixed prism 4 therebelow, which, in turn, conveys the image to the objective 5, and hence, to the blank film 6. Since the speed of translatory motion of the film 6 is equal to the speed of sliding of the unit elements of the image impressed successively and without discontinuity on the film, there is no relative movement between the film and the beams of light defining the successive elements of the image and, therefore, an image of the sector of the field scanned by the first objective 1 is formed completely at rest on the film.

Referring now to Fig. 2, it will be seen that a projector embodying this invention, includes a standard lighting assembly 21 (formed by a reflector, a lamp and a condenser) sending concentrated light rays through the positive film 2 which travels horizontally with continuous uniform motion in front of a projection objective 23. The individual elements of the image registered on the film are projected, as they pass the objective 3, onto the fixed prism 24, and are forwarded by the latter through the dove prism 25 to the projecting prism 26. The prisms 24, 25 and 26 are coaxial and the latter two turn in the same direction about their vertical axis; with the angular speed of the prism 25 being half of that of the prism 26. The beam of light leaving the prism 26 horizontally strikes a screen 27 arranged along an arc of a circle the centre of which coincides with the axis of rotation of the prism 26. The speed of rotation of prism 6 depends on the speed of translatory motion of the film according to the same law indicated above for the camera. Hence, on the screen 7 there is projected by successive elements without discontinuity and without relative sliding, the entire image reproduced on the film. Since the speed of rotation of the prism 26 is equal to at least 16 revolutions per second, each element of the individual image is projected onto the screen with the same frequency and superimposed in the visual memory, upon the corresponding preceding image: hence to the spectator the whole screen appears lighted contemporaneously even if actually it is only by successive zones and the movement appears reproduced with the original rhythm (if recording of the images was carried out with the same frequency), or accelerated or delayed at will (if the frequency of recording was smaller or greater, respectively).

What we claim is:

1. A 360 degree panoramic motion picture apparatus comprising means defining a sloping reflecting surface, a dove prism and a stationary objective arranged in optical alignment with each other, means for guiding an uninterrupted strip of cinematographic film along a rectilinear path and continuously driving said film at a constantly uniform linear speed, said objective being arranged between said sloping reflecting surface and the film, and means continuously rotating said sloping reflecting surface about a vertical axis in one direction at a constantly uniform rotational speed corresponding to said uniform linear speed at which said film is driven, and means continuously rotating said prism in said one direction about its longitudinal axis at a rotational speed which is equal to one-half the rotational speed of said sloping reflecting surface.

2. A 360 degree panoramic motion picture apparatus comprising means defining a sloping reflecting surface, a dove prism and a stationary objective arranged in optical alignment with each other, means continuously rotating said sloping reflecting surface about a vertical axis in one direction, means continuously rotating said prism about the longitudinal axis of the latter at a constantly uniform rotational speed equal to one-half the rotational speed of said sloping reflecting surface and in said one direction, and means for guiding an uninterrupted strip of photographic film along a rectilinear path and continuously driving said film in the direction corresponding to the rotation of said reflecting surface and at a uniform linear speed corresponding to the rotational speed of said reflecting surface, said objective being arranged between said sloping reflecting surface and the film.

3. A 360 degree panoramic motion picture apparatus comprising means defining a sloping reflecting surface rotatable about a vertical axis, a prism having a vertical reflecting surface and being also rotatable about said vertical axis and a stationary objective arranged in optical succession and in optical alignment with each other, means continuously rotating said sloping reflecting surface and said prism at constantly uniform speeds in the same direction about said vertical axis, but with the rotational speed of said prism being equal to one-half the rotational speed of said sloping reflecting surface, and means for continuously driving an uninterrupted strip of cinematographic film along a rectilinear path past said objective in the direction corresponding to the rotation of said sloping reflecting surface and prism and at a constantly uniform linear speed corresponding to the rotational speed of said sloping reflecting surface.

4. A 360 degree panoramic motion picture apparatus comprising means defining a sloping reflecting surface rotatable about a vertical axis, a prism having a vertical reflecting surface and being also rotatable about said vertical axis and a stationary objective arranged in optical succession and in optical alignment with each other, means continuously rotating said sloping reflecting surface and said prism at constantly uniform speeds in the same direction about said vertical axis, but with the rotational speed of said prism being equal to one-half the rotational speed of said sloping reflecting surface, and means for continuously driving an uninterrupted strip of cinematographic film along a rectilinear path past said objective in the direction corresponding to the rotation of said sloping reflecting surface and prism and at a constantly uniform linear speed equal to $2\pi FN$, where F is the focal length of said objective and N is the rotational speed of said sloping reflecting surface.

5. A 360 degree panoramic motion picture apparatus comprising means defining a sloping reflecting surface rotatable above a vertical axis and arranged at an angle of 45 degrees to said axis, a dove prism having a vertical reflecting surface and being also rotatable about said vertical axis and a stationary objective, said sloping reflecting surface, prism and objective being arranged in optical succession and in optical alignment, means continuously rotating said sloping reflecting surface and prism at constantly uniform speeds in the same direction but with the rotational speed of said prism being equal to one-half the rotational speed of said sloping reflecting surface, and means for continuously driving an uninterrupted strip of cinematographic film along a rectilinear path past said objective in the direction corresponding to the rotation of said sloping reflecting surface and prism and at a constantly uniform linear speed equal to $2\pi FN$, where F is the focal length of said objective and N is the rotational speed of said sloping reflecting surface.

6. A 360 degree panoramic motion picture apparatus comprising means defining a sloping reflecting surface rotatable above a vertical axis and arranged at an angle of 45 degrees to said axis, a dove prism having a vertical reflecting surface and being also rotatable about said vertical axis and a stationary objective, said sloping reflecting surface, prism and objective being arranged in optical succession and in optical alignment, means continuously rotating said sloping reflecting surface and prism at constantly uniform speeds in the same direction but with the rotational speed of said prism being equal to one-half the rotational speed of said sloping reflecting surface, and means for continuously driving an uninterrupted strip of cinematographic film along a horizontal path extending past said objective in the direction corresponding to the rotation of said sloping reflecting surface and prism and at a constantly uniform linear speed equal to $2\pi FN$, where F is the focal length of said objective and N is the rotational speed of said sloping reflecting surface.

7. A 360 degree panoramic motion picture apparatus comprising means defining a sloping reflecting surface rotatable above a vertical axis and arranged at an angle of 45 degrees to said axis, a dove prism having a vertical reflecting surface and being also rotatable about said vertical axis, a fixed reflecting surface arranged at an angle of 45 degrees to said axis, a fixed objective arranged with its optical axis extending horizontally, said rotatable sloping reflecting surface, prism, fixed reflecting surface and objective being in optical succession and alignment with each other, means continuously rotating said rotatable sloping reflecting surface and prism at constantly uniform speeds in the same direction but with the rotational speed of the latter being equal to one-half the rotational speed of said sloping reflecting surface, and means for continuously driving an uninterrupted strip of cinematographic film laying in a vertical plane along a horizontal path extending past said objective at a linear speed equal to $2\pi FN$, where F is the focal length of said objective and N is the rotational speed of said rotatable sloping reflecting surface.

References Cited in the file of this patent

UNITED STATES PATENTS

| | | |
|---|---|---|
| 511,133 | Fretwell | Dec. 19, 1893 |
| 705,771 | Lumiere | July 29, 1902 |
| 708,775 | Lumiere | Sept. 8, 1902 |
| 815,657 | Swasey | Mar. 20, 1906 |
| 866,257 | Case | Sept. 17, 1907 |
| 1,006,230 | Kollmorgen | Oct. 17, 1911 |
| 1,161,556 | Watkins | Nov. 23, 1915 |
| 1,829,634 | Chretien | Oct. 27, 1931 |
| 1,956,736 | Thun | May 1, 1934 |
| 2,068,410 | Hanke et al. | Jan. 19, 1937 |
| 2,438,878 | Waller | Mar. 30, 1948 |
| 2,587,433 | Bentley et al. | Feb. 26, 1952 |